United States Patent
Reed et al.

(10) Patent No.: US 7,299,241 B2
(45) Date of Patent: *Nov. 20, 2007

(54) BUILDING ANALYTICAL MODELS WITH STANDARDIZED VIRTUAL FLAT FILES

(75) Inventors: Kenneth L. Reed, Mission Viejo, CA (US); Theodore Ansusinha, Plymouth, MN (US)

(73) Assignee: Accenture Global Services GmbH, Schaffhausen (CH)

( * ) Notice: Subject to any disclaimer, the term of this patent is extended or adjusted under 35 U.S.C. 154(b) by 126 days.

This patent is subject to a terminal disclaimer.

(21) Appl. No.: 11/147,034

(22) Filed: Aug. 17, 2005

(65) Prior Publication Data

US 2005/0273462 A1    Dec. 8, 2005

Related U.S. Application Data

(63) Continuation of application No. 10/302,337, filed on Nov. 22, 2002, now Pat. No. 7,047,251.

(51) Int. Cl.
*G06F 17/30* (2006.01)
(52) U.S. Cl. .................................... 707/102
(58) Field of Classification Search ............. 707/1–10, 707/100–104.1, 200–2; 719/328; 709/219
See application file for complete search history.

(56) References Cited

U.S. PATENT DOCUMENTS

| 5,806,062 | A  | * | 9/1998 | Chen et al. .................... 707/4 |
| 2003/0009536 | A1 | * | 1/2003 | Henderson et al. ......... 709/219 |
| 2006/0090171 | A1 | * | 4/2006 | Laborczfalvi et al. ...... 719/328 |

* cited by examiner

*Primary Examiner*—Diane D. Mizrahi
(74) *Attorney, Agent, or Firm*—Oppenheimer Wolff & Donnelly, LLP.

(57) ABSTRACT

A system and method for creating virtual flat customer records derived from database customer data that may be used as standardized input for analytical models. A Customer Analytic Record ("CAR") application may be created as a database object to extract, transform, and format all of the customer data needed for customer segmentation and predictive modeling. The CAR may be a set of database views that are defined using virtual stored queries The CAR application may dynamically calculate additional variables using predetermined transformations, including custom transformations of an underlying behavior. The CAR is preferably a dynamic view of the customer record that changes whenever any update is made to the database. The definition of the CAR provides documentation of each data element available for use in models and analytics.

9 Claims, 13 Drawing Sheets

| | SEGMENT 1 | SEGMENT 2 | SEGMENT 3 | SEGMENT 4 | SEGMENT 5 | SEGMENT 6 |
|---|---|---|---|---|---|---|
| SEGMENT NAME | MORTGAGE OWNERS | BIG SAVERS | SMALL SAVERS | NORMAL SAVERS | NEW CUSTOMERS | NEW ENTRENCHED CUSTOMERS |
| DESCRIPTION | HIGH BALANCE MORTGAGES | HIGH BALANCES IN CHECKING AND SAVINGS | SMALL BALANCES IN CHECKING AND SAVINGS | CHECKING AND SAVINGS ACCOUNTS | ONLY CHECKING ACCOUNT WITH LOW BALANCE | OWNS THE MOST PRODUCTS BANK CREDIT CARDS |
| % OF SAMPLE POPULATION | 30 | 8 | 4 | 17 | 25 | 16 |
| LIFT | 0.3 | 2.8 | 1.1 | 1.3 | 0.7 | 2.2 |
| ASSET ACCOUNT | FEW ACCOUNTS | LOW BALANCES | HIGH CHECKING AND SAVINGS BALANCES | HIGH CHECKING AND SAVINGS BALANCES | AVERAGE BALANCES FEW ACCOUNTS LOW BALANCES | HIGH CHECKING, SAVINGS AND CD BALANCES |
| LOAN ACCOUNTS | HIGH MORTGAGE BALANCES | FEW LOAN ACCOUNTS LOW MORTGAGE BALANCES | LOWEST LOAN BALANCES NO MORTGAGES | FEW LOAN ACCOUNTS WITH LOW BALANCES | HIGH MORTGAGE LOAN BALANCES | HIGH MORTGAGE BALANCES |
| TENURE | 5 YEARS | 10 YEARS | 10 YEARS | 8 YEARS | 6 YEARS | 13 YEARS |
| TRANSACTION ACTIVITY | LOWEST | HIGH NUMBER OF DEPOSITS ONLY | HIGH NUMBER OF TRANSACTIONS | AVERAGE | AVERAGE | HIGH NUMBER OF TRANSACTIONS |
| DEMOGRAPHICS | HIGHER HOME OWNERSHIP RATES | HIGHER AVERAGE INCOME RATES | LOWER AVERAGE INCOME RATES | HIGHER HOME OWNERSHIP RATES AVERAGE DEMOGRAPHICS | LOWER HOME OWNERSHIP RATES | HIGHER AVERAGE INCOME RATES |

FIG. 1B

| TARGETS | DESCRIPTION | HYPOTHESES | POTENTIAL OFFERS |
|---|---|---|---|
| SEGMENT 6- ENTRENCHED CUSTOMERS | HAVE VERY HIGH $ ASSETS<br>OWN THE MOST BANK PRODUCTS<br>HAVE A MORTGAGE LOAN<br>CONSERVATIVE, LONG TERM INVESTORS<br>LONGEST BANK RELATIONSHIP | VALUE INVESTING ADVICE FROM TRUSTED SOURCE<br>VALUE INTEGRATED PRODUCT OFFERING FROM THE BANK | FREE SUBSCRIPTION TO INVESTING PUBLICATION<br>BUNDLED PRODUCT OFFERING-BANKING AND BROKERAGE |
| SEGMENT 2-BIG SAVERS | HAVE HIGH $ ASSETS IN SAVINGS AND CHECKING<br>ACTIVE TRADERS<br>MOSTLY DEBT FREE | VALUE FREE TRADES AS A FORM OF CURRENCY<br>VALUE INVESTING ADVICE TO MAKE SMARTER INVESTMENTS | FREE TRADES<br>FREE SUBSCRIPTION TO INVESTING PUBLICATION |

FIG. 1C

BUILDING ANALYTICAL MODELS WITH STANDARDIZED VIRTUAL FLAT FILES

RELATED APPLICATIONS

This is a continuation application of application Ser. No.10/302,337, filed 22 Nov. 2002 now U.S. Pat. No. 7,047,251. This application is related to commonly assigned patent applications Ser. No. 10/302,395, filed on 22 Nov. 2002 and titled "Adaptive Marketing Using Insight Driven Customer Interaction", and Ser. No. 10/302,418, filed on 22 Nov. 2002 and titled "Multi-Dimensional Segmentation For Use In A Customer Interaction". This application is also related to commonly assigned U.S. patent application Ser. No. 10/014,840, filed Oct. 22, 2001, and titled "Real-Time Collaboration and Workflow Management for a Marketing Campaign", all of which are incorporated herein by reference.

FIELD OF THE INVENTION

The invention relates to analytic model input, and more particularly to standardizing data for input into analytic models.

BACKGROUND OF THE INVENTION

Many businesses use a campaign process to deliver marketing offers to a variety of consumers. The campaign process may be, for example, by telephone or by mass mailing. In order to define the campaigns to execute, the business may gather and aggregate information about their customers from a variety of data sources, both from within their company as well as from third party data providers. After gathering the consumer information, the businesses may decide to separate customers into groupings, customer segments, which have similar characteristics. The businesses may then create a specific list of consumers that the businesses hope will respond positively to the campaign. Sometimes, these lists may be produced using generalized marketing response models—models developed on generalities about the firm's customers rather than specifics about likely customer response to forthcoming campaign offers. These general models are sub-optimal. But more often, the lists are purchased from third-party vendors, or extracted from internal databases using SQL-based rules. Not infrequently, telemarketing relies simply on lists of bare telephone numbers selected from particular area codes and exchanges, with no information about the prospect until the contact is actually established.

This process typically can be time consuming and deliver sub-optimal results. Businesses typically employ personnel to search for the consumer information. The personnel may individually search a number of disparate databases attempting to gather the consumer information. This could include information that helps to identify the customer (e.g., name, address, phone, electronic mail address, etc.), information on products or services the customer has purchased in the past, and any additional contextual information captured during past contacts with the customer. Oftentimes, this information is stored in disparate databases in inconsistent formats, making it very difficult to formulate a total, integrated view of a customer. The databases may also contain stale data that produces poor or even erroneous results.

Businesses may attempt to purchase additional information about existing or prospective customers from third party data providers (e.g., Equifax, etc.). Types of information purchased may include demographic data (e.g., income level, house size), lifestyle data (e.g., activities the customer participates in, etc.), and interests (e.g., information indicating the customer enjoys eating at restaurants, going to see movies, etc.). Oftentimes, businesses find it challenging to integrate externally purchased data with their own customer data. When data is merged from multiple data sources, sophisticated programming skills are required to link records as well as to aggregate information and calculate values that could be useful to predict customer behavior. Further, the extraction of data from multiple sources to drive analytical modeling can be a very laborious, time consuming process given the number of joins that have to be written. Oftentimes, businesses do not have common extract procedures meaning that new extract routines have to be written each time a new form of data analysis needs to be performed.

More advanced database marketers make heavy use of analytics and modeling. Customer segmentations based on commercially available demographics, lifestyle, and life-stage data are often used to help define campaigns. These data are also used to target individuals. Unfortunately, because these data are usually compiled at the zip code or census-tract level, application to individuals for targeting is subject to a great deal of error. Propensity models (models comparing attributes of prospect lists to attributes of existing customers) are often developed by businesses and used to develop targeting lists of persons who look like existing customers, hence may have a greater propensity to respond to the business' marketing campaigns. Some more sophisticated businesses are able to develop response models (models based on respondents to actual campaigns); these models tend to outperform the other list generating methods. However, these more sophisticated models require more sophisticated methods and better data. The cost of developing these models can be high.

For example, a typical model development process may require two or three people and four to twelve weeks (i.e., 12-36 people-weeks) to extract the required customer data and build an analytic model. Then developing a scoring algorithm may take a person four additional weeks. Thus, targeting models are costly. The cost and time required for model development encourages the development of generalized marketing models that are often used for a year or more. Generalized models are commonly outperformed by as much as one hundred percent (100%) by models developed specifically for a particular campaign or offer. Over time, models degrade in performance, but are often used long after their performance peak. This results in diminished marketing returns and often results in abandonment of the use of models for targeting. A second problem is that the data used to create the predictive models and ultimately define and execute the marketing campaigns is old by the time the models are run, leading to out of date model results and poor offer acceptance rates for the resulting marketing campaigns.

The time-consuming conventional modeling and marketing processes cannot support rapid test and learn iterations that could ultimately improve offer acceptance rates. After completing a marketing campaign, the personnel may gather the results of the campaign to determine a success rate for the campaign. The results, however, are typically not effectively fed back into the customer information database and used to re-analyze predictive customer behavior. Without an effective closed-loop, businesses lose the ability to retrain their analytical models and improve their campaigns by defining campaigns that have a greater return.

The effect of the previously described issues extend beyond marketing campaigns to all forms of interaction. A business' inability to execute an effective, closed loop process to tailor their marketing campaigns affects all forms of customer interaction. Ideally, a business should strive to deliver the right message to the right customer through the best channel. Customers who are the target of an outbound marketing campaign should be able to receive the same offer should they interact with the business through any interaction channel (e.g., web, phone, retail branch, etc.) to perform a service transaction, sales transaction, etc. However, since traditional methods prevent the business from quickly generating reliable, targeted offers for customers based upon predictive analytical models and refined through rapid test and learn iterations, they are unable to deliver optimized marketing offers tailored to their customers and prospects across all forms of customer interaction; best offer to the right customer through the best channel.

SUMMARY OF THE INVENTION

This invention relates to a system and method for creating customer records that include customer data that may be used as standardized input for analytical models. A Customer Analytic Record ("CAR") application may be created as a database object to extract, transform, and format all of the customer data needed for customer segmentation and predictive modeling. The CAR may be a set of database "views" that are defined using virtual stored queries and enabled using capabilities of a data base management system and a structured query language. Essentially, the CAR is a virtual "flat" record of the customer data needed for customer analytics. The customer data may be extracted by running one or more SQL queries against the database view(s). The CAR application may dynamically calculate additional variables using predetermined transformations, including custom transformations of an underlying behavior. If additional variables are created during the course of an analysis or model development process, the CAR may be modified to include the additional variables for subsequent use. The CAR is preferably a dynamic view of the customer record that changes whenever any update is made to the database. The definition of the CAR provides documentation of each data element available for use in models and analytics.

BRIEF DESCRIPTION OF THE DRAWINGS

FIG. 1B is a table illustrating segmented customer data according to one embodiment of the invention.

FIG. 1C is a table illustrating the definition of a marketing campaign according to one embodiment of the invention.

DETAILED DESCRIPTION OF THE PREFERRED EMBODIMENTS

Figure 1A:
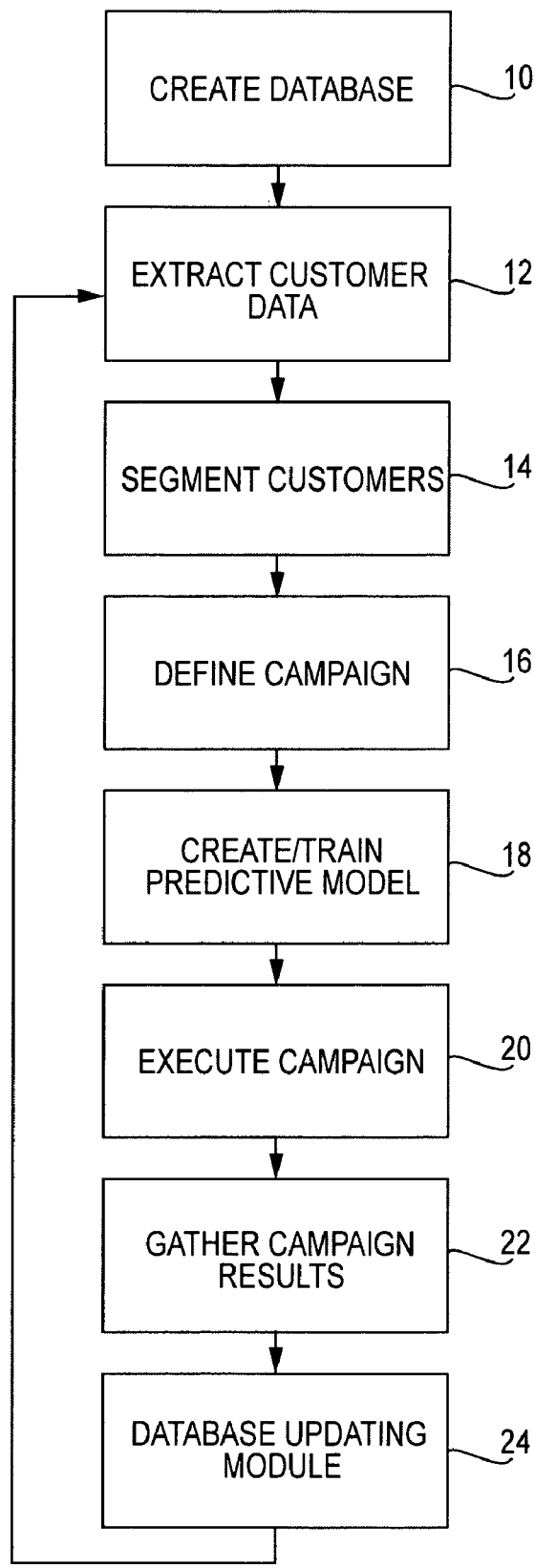
FIG. 1A is a block diagram of a method for adaptive marketing using insight driven customer interaction according to one embodiment of the invention.

The invention relates to adaptive marketing using insight driven customer interaction. The invention can be extended to other customer interactions in which insight improves the interaction between an enterprise and its customers. FIG. 1A illustrates a method for adaptive marketing using insight driven customer interaction according to one embodiment of the invention. Initially, a database may be created to store customer data, step 10. The customer data may be collected through internal, external, and/or business partner data sources. The database used for storing customer data may be any known data storage mechanism, generally a relational database often referred to as a data warehouse. According to one embodiment of the invention, the data warehouse platform used for storing the customer data is powered by NCR's Teradata system.

The data may be extracted from the database, step 12. In one embodiment, a CAR/PAR application may be used to extract data from the database and then transform, aggregate, and combine the data into standardized virtual flat file records for each customer, such as a customer analytic record (CAR) for existing customers and a Prospect Analytic Record (PAR) when the targeted consumers are not current customers of the company. The step of transforming the data may include custom transformations to fill the calculated CAR fields. The CAR may be used as input to descriptive and predictive models to determine how consumers are likely to respond to marketing offers. The models may also be used to predict a likelihood of attrition or other behaviors.

According to one embodiment of the invention, the CAR may be produced via a view. A database view is a virtual query. The CAR is usually written as a set of views that do all the "flattening out" of the data and also computes the ratios, etc. that may be used in modeling. Consider the following basic SQL statement:

```
select cust_id,
            acct_balance_RTM,
            max( account_balance)
    from        txn_table
    where       behavior_segment = 1
    and    acct_balance_RTM < 1
    order by    cust_id;
```

This statement may be executed by a database system to return a sorted list of customer ids, account balance ratio-to-mean and their maximum account balances. The result may be a table if left in the database or a flat file if exported. The query may be changed to generate a view using, for example, the following:

```
create view CAR_rtmmax_balance as
select cust_id,
    acct_balance_RTM,
    max( account_balance)
from txn_table
```

This creates a virtual table or "view" in the database. The CAR prefix indicates that the view CAR_rtmmax_balance is a component of the overall CAR application. A user may now query CAR_rtmmax_balance as though this component was a table in the database:

```
select * from CAR_rtmmax_balance
where behavior_segment = 1
and acct_balance_RTM < 1
```

The view looks just like a table to the user. Because CAR_rtmmax_balance is a view, a query automatically returns the latest values that have been loaded into the database. If the information in the view was stored in a permanent database table (of the same or different name), a special update process would be necessary in order to capture changes made to a base table, txn_table. The optimal configuration for the CAR development is to define is a set of dynamic views of the customer data within the data warehouse. This enhances data integrity in the resulting analytic data set.

The CAR/PAR data may include identification and behavior fields. The identification fields may be for household information such as a household identifier, address, and phone number and household individual information such as name and electronic mail address. The behavior fields summarize transaction information and contain statistical transformation of this data for analytical use. Examples include account summary data, ratio to mean and z-score calculations, moving average and moving difference calculations over a specified period of time, log transformations and slope calculations.

The CAR may also include demographic fields. The demographic fields may include, for example, income level and house size. The demographic fields also include fields pertaining to lifestyle and interest. The lifestyle fields may include, for example, whether the individual is a domestic, enjoys the outdoors such as hiking, biking, camping, walking, running, etc., and whether the individual is athletic or enjoys sports. The interest fields may indicate, for example, whether the individual likes to travel, play video games, drink wine, play sports, watch sports, read, etc. Preferably, each of the fields and data included in the CAR may be cross-referenced to an individual's household. This may be performed by linking a household identifier to an individual's identifier.

The CAR may also include a contact history. The contact history may include information related to promotions offered to a customer, promotions redeemed by the customer, elapsed time for the offer to be redeemed, and telephone calls made or emails sent to the customer by a contact center or received from the customer by a contact center. The contact center may be, for example, an on-line support system, a sales representative center, etc.

The CAR also preferably includes model scores. The model score fields may include an individual identifier such as a primary key, a model primary segment or decile such as segment number or predictive model score decile, and a model score such as a predictive model score or a response model score. The model score may also include a household identifier that may be used to cross-reference a customer to a household.

In addition to identification fields, behavior fields, demographic fields, contact history fields, and model score fields, the CAR also preferably includes fields representing product ownership information. Product ownership includes a complete listing of all of the products and services that a customer has previously purchased from the business. Such product ownership information in the CAR record provides a more complete picture of each customer and may be used in determining which offers to extend to certain customer segments.

Segmentation may be performed based on the data extracted, step 14. The segmentation process may establish customer segments, for example, 6-9 groups of customers that are used to drive the campaign strategy and design. The customer segments may be created based on similar characteristics among a plurality of customers. Segmentation is usually based on a random sample set of customer records extracted through the CAR views. For example, the data extracted from the database may be for approximately thirty (30) million customers. Segmentation, however, may be performed only on a percentage, for example, ten (10) percent, of the customer records. Therefore, segmentation may be performed for three (3) million customer records instead of thirty (30) million. Preferably, the three (3) million customer records are randomly selected, however, any manner of selecting the customer records may be used. Although a fewer number of customer records may be used for segmentation, by using a random sample set of a percentage of customer records, a fairly accurate depiction of the customers may still be obtained. Some technologies enable segmentation of the complete customer record. This may be advantageous for segmentation, however, a good random sample will usually be much easier to handle and can produce statistically valid results.

Once the customer segments have been defined, they are profiled in terms of behavior, value, and possibly demographic, lifestyle and life-stage data. This allows the business users to understand and "name" the segments. If the business user cannot name the segments, then the process is repeated until he can. This ensures that the segments are statistically valid and have meaningful business value. At this time, all of the customer records in the database are updated to reflect the segmentation results. FIG. 1B demonstrates a sample segmentation profile. Segments have been defined as customers having mortgages only, big savers, small savers, normal savers, new customers, and entrenched customers. Each segment is described through a description, percentage of sample population falling within the segment, a lift value, asset accounts, loan accounts, tenure, transaction activity, demographics, etc.

After segmenting the customer records, a marketing campaign may be defined for one or more customer segments based upon what's known about the customers in the segment, step 16. For example, referring to FIG. 1B, the lift value may indicate a likelihood for a customer segment to redeem an offer. The lift value may be calculated by dividing a number of accounts held by a predetermined number of customers divided by the number of customers. The lift value provides a factor that may be used to target specific segments and reduce the total number of customers to whom an offer is to be communicated. A reduction in costs is achieved because fewer telephone calls or mailings are necessary to achieve substantially the same or higher response. For example, if a marketing campaign results in 100 new accounts for a bank out of the 1,000,000 customers contacted with the marketing offer, 0.0001 is the calculated lift. By using adaptive marketing through the present invention, 100 new accounts may be opened by contacting just the 400,000 customers most likely to respond (as determined by the model). In FIG. 1B, because segments 2, and 6 have a high lift value, these segments may be targeted for a marketing campaign. By using adaptive marketing, a 0.0025 lift results, which means that for the same number of sales, 600,000 fewer customers needed to be contacted. Because, each contact has a cost, a reduction of 600,000 contacts in an outbound telemarketing context may save millions of dollars in marketing costs.

Next, a predictive model may be created/trained to determine the specific offers to provide to customers based on the data extracted, step 18. Predictive models may be created when a first marketing campaign is defined. Predictive models are often developed using statistical methods like logistic regression, but data mining technologies like neural nets, decision trees may also be used. FIG. 1C is a table that provides a description, hypotheses, and potential offers for segments 2 and 6. Prescriptive models may be defined and executed to determine which of these offers to provide and which specific customers in each segment should be targeted. After the first campaign is executed, the predictive model may be trained using insight obtained from the first marketing campaign. Such training of analytic models is well known in the art, as are the tools to accomplish the modeling. For example, software developed and sold by KXEN, Inc. (Knowledge Extraction Engines) of San Francisco, Calif. may be used.

After training a predictive analytic model, a marketing campaign for one or more customer segments may be executed, step 20. The marketing campaign may be run by communicating offers to the customers through a customer interaction. The customer interaction may be, for example, a telephone call to the home of a customer or a mailing of an offer to the customer's home.

As the campaign is executed, the results of the campaign may be captured, step 22. It should be noted that the invention reduces marketing campaign cycle times and provides adjustments for competitive positioning in a changing market. The invention achieves this by not requiring an arduous data extraction, transformation, modeling, and scoring process to have to be repeated each time a marketing campaign is desired as discussed above. Marketing cycle times are reduced by simplifying the extraction and transformation of all the customer data elements needed for analytic modeling. The CAR application includes all the necessary logic to extract the data from a database and all of the transformations needed to create additional customer data elements for segmentation and predictive modeling. Pre-built data models can also be re-used or leveraged since the models all rely on the same standard data inputs. The invention uses insight developed from prior campaigns to update a customer database.

The results may include, for example, the number of offers redeemed, which customers redeemed the offer, the time elapsed between the offer presentation and redeeming of the offer, and other information. The database may then be updated automatically with the results of the marketing campaign, step 24. This update may be done via a series of SQL update statements, for example. The marketing campaign results provide insight regarding a customer's behavior toward redeeming offers. The insight may be, for example, what types of offers a customer is likely to accept, which customers are more inclined to accept an offer, how quickly a customer redeems an offer, etc. This information may be used to refine further customer interactions to increase the number of offers accepted. Thus, through the interaction with the customer, insight (knowledge) is gained that is used to improve future interactions, such as marketing campaigns. This may be performed by repeating the steps of the method for adaptive marketing using insight driven customer interaction. Based on new customer data extracted (including part or all of the updated data that is the insight gained from the prior interaction), the predictive model may be trained resulting in a more accurate picture of anticipated customer responses to marketing offers. The adaptive model is usually developed to support each new campaign. Due to the rapidity of model development, enabled by this process, models can be developed to support each new campaign, then re-trained (adapted) to provide a mid-campaign correction if necessary. This process may be repeated for any desired number of customer interactions.

Figure 2:
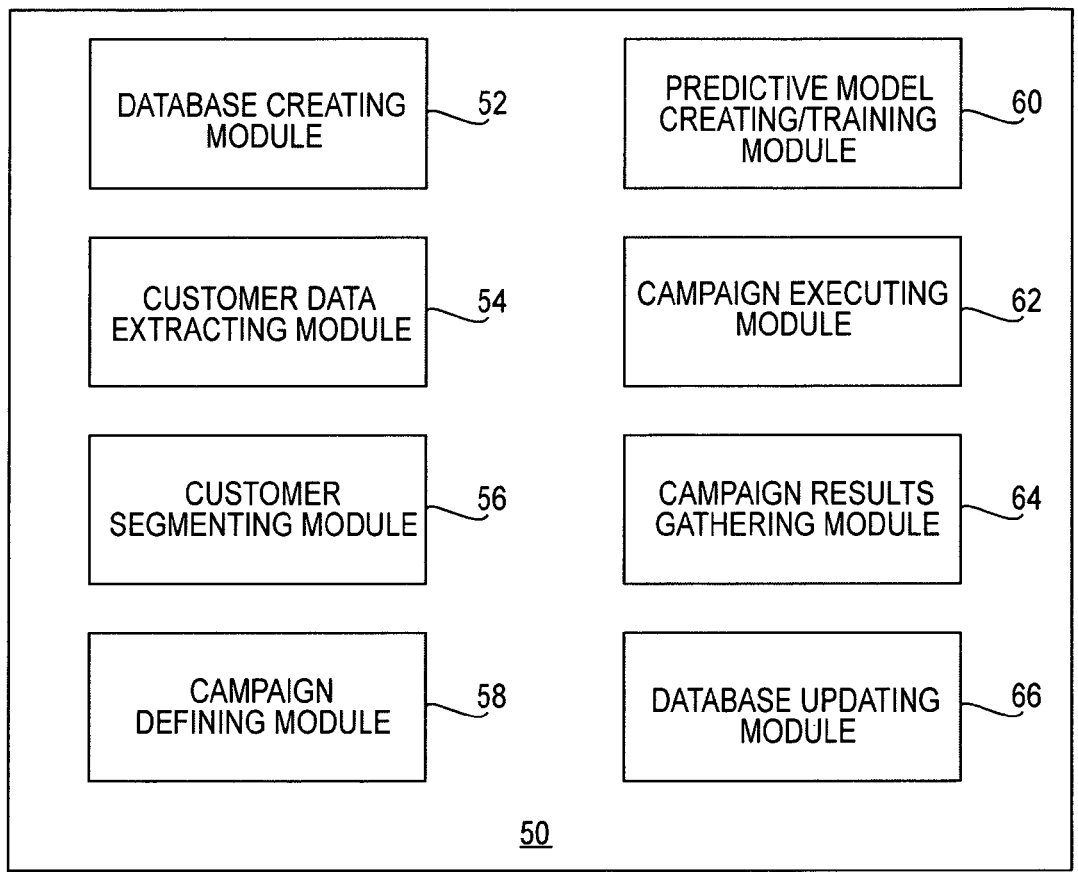
FIG. 2 is a block diagram of a system for adaptive marketing using insight driven customer interaction according to one embodiment of the invention.

FIG. 2 illustrates a system 50 for adaptive marketing using insight driven customer interaction according to one embodiment of the invention. The system 50 may include a database creating module 52 that provides a database for storing customer data. A customer data extracting module 54 may be used to extract, transform, and format the customer data from the database for segmentation and training a predictive model. A customer segmenting module 56 may be used to segment customer records that provide a profile of a customer into segments of customers that have similar characteristics. A campaign defining module 58 may be used to define a campaign for one or more customer segments identified by customer segmenting module 56. A predictive model creating/training module 60 may be used to create/train a predictive model for determining how a customer may react to a marketing offer. The predictive model may be created when a first marketing campaign is defined and trained when subsequent marketing campaigns are defined using insight obtained from the first marketing campaign. The predictive model may be used to predict customer behavior regarding one or more offers communicated to the customer. The predictive model may indicate, for example, that the customer is highly likely, likely, unlikely, or very unlikely to accept the offer. This assists in defining targeted treatments, offers, and marketing campaigns based upon an integrated view of the customer resulting in improved marketing campaigns.

Based on the predictive model, a campaign executing module 62 may be used to define and execute one or more campaigns to be communicated to the customer. The campaigns may include, for example, telephoning or mailing offers to the customers that are likely to accept the offer.

As a campaign is executed, the results of the campaign may be gathered. The results may include, for example, the number of offers accepted, the identification information for the customers who accepted the offers, the length of time between initiating the customer interaction and acceptance of the offer, and other information. The campaign results may be gathered using campaign results gathering module 64. The database storing the customer data may then be updated with the campaign results using database updating module 66. The campaign results may be used to refine additional customer interactions with the customers. For example, the customer results may show that a particular offer was not well received by the customers or that a particular segment of customers redeemed a large percentage of a particular offer. Therefore, based on this information, additional customer interactions may be refined to target the customer segment that accepted a large percentage of the offers. The offer not well received by the customers may be altered to induce future acceptance of the same or a similar offer or possibly canceled. The offers may be, for example, coupons to be used at restaurants, movie theaters, amusement parks, etc. or for services rendered.

Figure 3:
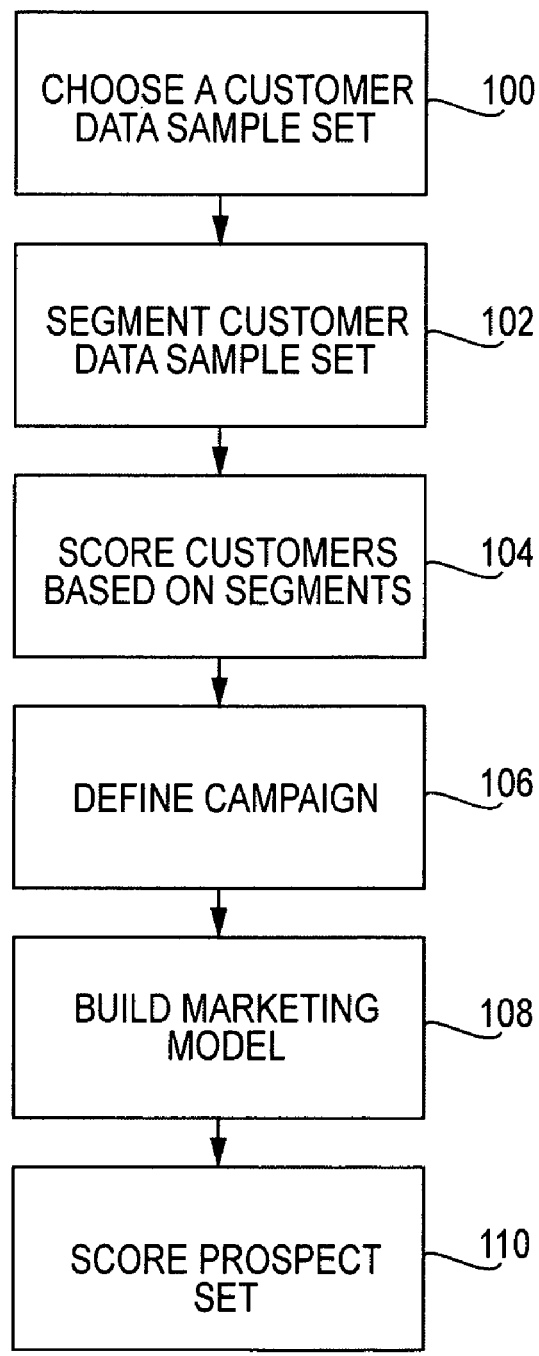
FIG. 3 is a block diagram of a method for segmentation and predictive modeling for adaptive marketing using insight driven customer interaction according to one embodiment of the invention.

FIG. 3 illustrates a method for training a predictive analytic model according to one embodiment of the invention. A predictive analytic model may be created/trained by choosing a customer data sample set, step 100. The sample set may be, for example, a percentage of customer records from a total number of customer records such as ten (10) percent. The sample set may be segmented to divide customers into segments having similar characteristics, step 102. The customers associated with each segment may be given a score to identify to which customer segment each customer belongs, step 104. A marketing campaign for one or more of the customer segments may be defined, step 106. The marketing campaign may include one or more offers to be delivered to the customers. A predictive marketing model is constructed to assess each customer's propensity to respond to an offer in the targeted customer segments, step 108.

The results from running the marketing model are used to score prospective customers, step 110. The prospect set may be used for determining which offers are to be communicated to which customers. According to one embodiment of the invention, KXEN technology may be used to build the marketing model and score the prospect set. According to one embodiment, the customers receiving the highest score may be deemed most likely to accept a particular offer. A lower score may indicate a lower acceptance response to the offer. Therefore, offers are preferably communicated to customers receiving high scores.

Figure 4:
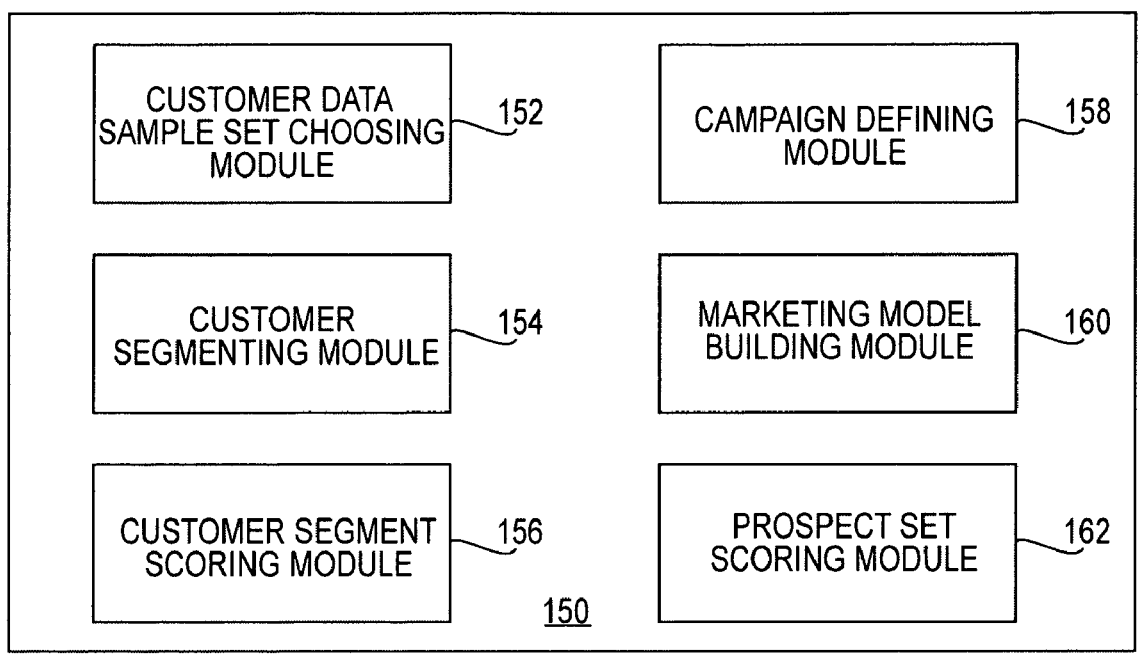
FIG. 4 is a block diagram of a system for segmentation and predictive modeling for adaptive marketing using insight driven customer interaction according to one embodiment of the invention.

FIG. 4 illustrates a system 150 for training a predictive analytic model according to one embodiment of the invention. The system 150 may include a customer data sample set choosing module 152. The customer data sample set choosing module 152 may choose a sample set of customer data to be used to group customers into segments. A customer segmenting module 154 may be used to segment customer records according to similar characteristics. A customer segment scoring module 156 may be used to update customer records to reflect their assigned segment created by customer segmenting module 154. Based on the profiles of each of the defined customer segments, a marketing campaign may be defined using campaign defining module 158. The marketing campaign may propose which offers are to be targeted to which customer segments.

Next, a marketing model is built to assess customers' propensity to respond to proposed offers using the marketing model building module 160. The marketing model may then be used to score a prospect set of customers using prospect set scoring module 162. Based on the results generated by the prospect set scoring module 162, the customers that receive a high score may be communicated an offer.

Figure 5:
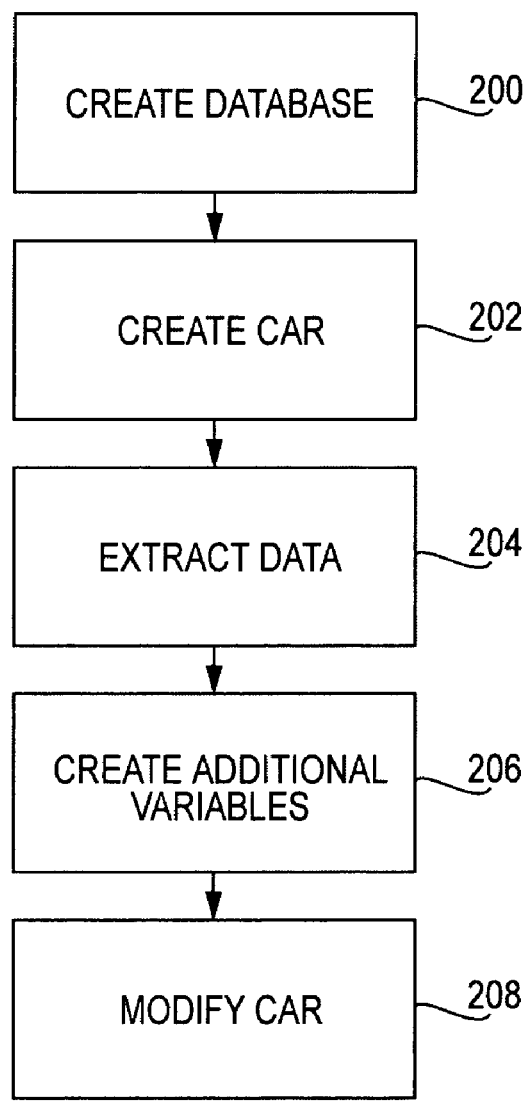
FIG. 5 is a block diagram of a method for creating a standardized input for analytic models for adaptive marketing using insight driven customer interaction according to one embodiment of the invention.

FIG. 5 illustrates a method for creating a standardized input for analytical models according to one embodiment of the invention. A database for storing customer data may be initially created, step 200. A CAR may be created to extract, transform, and format the customer data to be used as input for an analytic model, step 202. The CAR provides a database object that may include one or more database views and dynamic and temporary tables. Dynamic tables are automatically developed at the beginning of a query and destroyed when completed whereas temporary tables are usually pre-loaded with data and persist after the query has finished. Dynamic and temporary tables are typically used for performance reasons or to store data in a certain manner.

The customer data may be extracted from the database by running one or more queries on the CAR, step 204. The SQL queries against the CAR may themselves create additional variables by operating on the data returned by the CAR queries, step 206. Some examples of these transformations are slopes and ratio calculations. Slopes may be calculated when a customer record contains time series transaction data (e.g., number of transactions per week, account balance per month, etc). Plotting these trends on a time graph allows a straight line to be fitted through the points. The slope of the line is an indicator of whether the rate of transactions is increasing or decreasing over time. Ratios provide another good way to analyze data (e.g., the ratio of one customer's account balance compared to the average balance of all customers in the segment). These variables provide additional predictive power to models. For example, ratios-to-means and slopes are very important inputs to retention models. When the slope of a customer's account balance is decreasing at a high rate, determined by the ratio of decline compared to the mean, it's a good predictor that the customer is planning to take his or her business to another establishment. If the business recognizes this trend in advance and identifies that this is a high value customer, it can take measures to attempt to retain the customer.

The CAR is a method of setting up virtual stored queries that include table fields as well as calculated fields created using capabilities of a Data Base Management System (DBMS) and a structured query language (SQL) such that the stored queries present to the user a virtual flat file that may be used as input to an analytic engine. The capabilities of the DBMS and SQL may include, for example, (1) functional objects available within SQL to perform certain statistical and mathematical operations on data retrieved from the database: e.g., average, standard deviation, ranking, moving averages, regression, logarithmic transformation, sequence analysis, etc.; (2) ability to process and complete queries that may contain one or more mathematical or statistical operations against a 3rd Normal Form database, which implies the ability to join many tables to produce the query answer sets; (3) the capability to express these complex queries as an object in the database, either as a view or as a pre-defined function usable in a SQL query; (4) the capability to nest these views and otherwise combine them into other higher-level views or in ad hoc SQL queries; (5) the ability to create dynamic or temporary relational tables on the fly (during the course of execution of queries); (6) the ability to define and query these views and other data objects within a very large relational database that may be dozens of terabytes in size, that may contain tables with billions of rows of data.

If additional variables are created, from CAR data or database data during modeling or analysis processes, the CAR may be modified to include the additional variables, step 208. In this manner, the additional variables become part of the CAR and are available for future modeling and analytic requirements.

Figure 6:
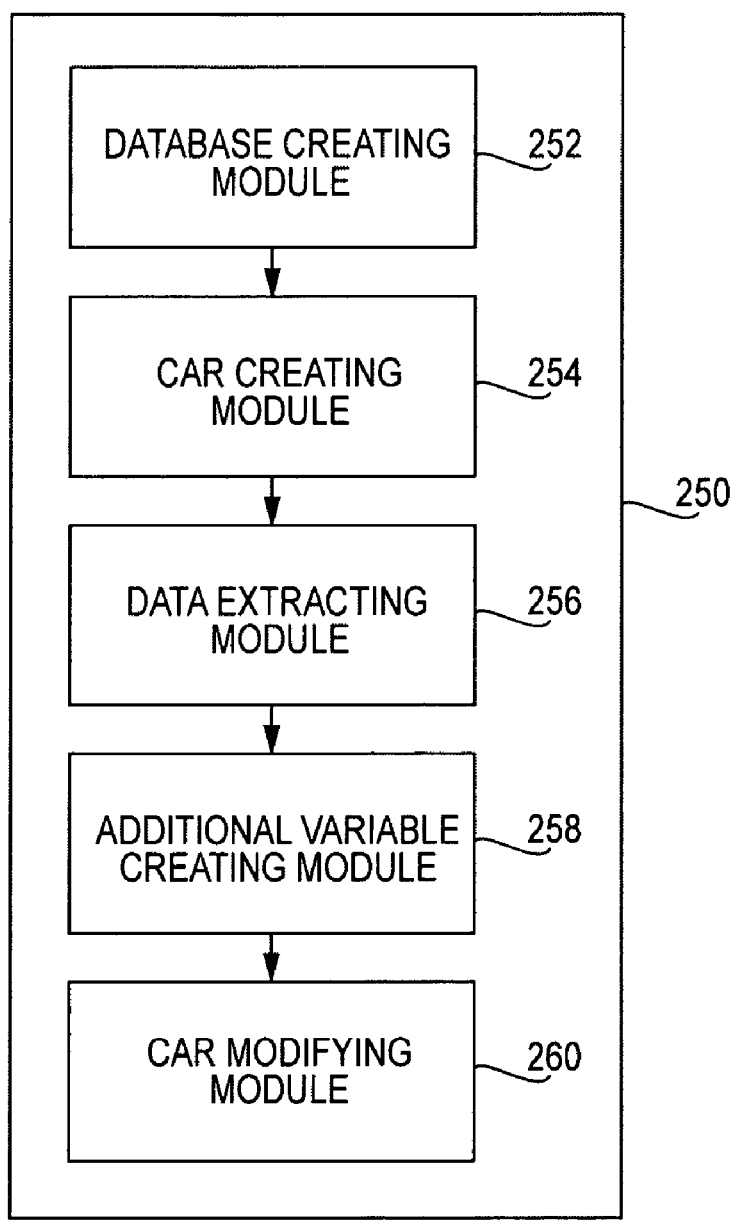
FIG. 6 is a block diagram of a system for creating a standardized input for analytic models for adaptive marketing using insight driven customer interaction according to one embodiment of the invention.

FIG. 6 illustrates a system 250 that may be used for creating a standardized input for analytical models according to one embodiment of the invention. The system 250 may include a database creating module 252. The database creating module 252 may provide a database for storing customer data. A CAR may be created for the purpose of extracting, transforming, and formatting the customer data to be used as input for an analytic model using CAR creating module 254. The CAR preferably provides a database object that may include one or more views. A customer data extracting module 256 may be used to extract the customer data from the database using the CAR. The customer data may be extracted by running one or more queries against the view(s). Based on the data queried, additional variables may be created by the CAR view(s) using additional variable creating module 258. If additional variables are created, the CAR may be modified to include the additional variables using CAR modifying module 260. The CAR may then be used to provide standardized input for analytical models. The CAR preferably includes all of the information necessary to predict customer behavior and define targeted customer interactions with a customer.

Figure 7A:
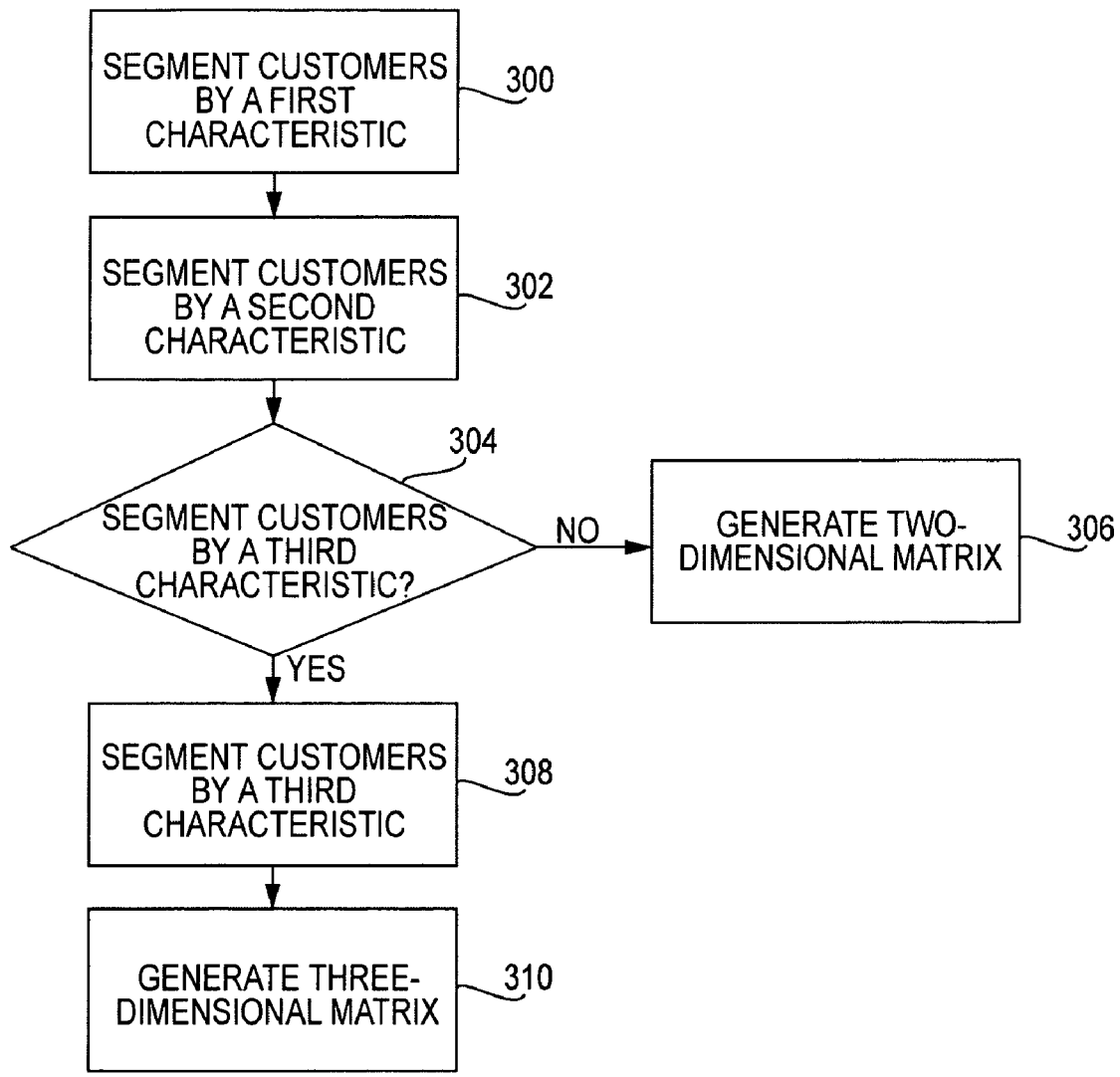
FIG. 7A is a method for developing multi-dimensional segmentation according to one embodiment of the invention.

FIG. 7A illustrates a method for segmenting data representing a plurality of customers for use in a customer interaction according to one embodiment of the invention. Customer data may be segmented according to a first characteristic, step 300. The first characteristic may include, for example, behavior data. To execute behavior segmentation, preferably, only the variables of the CAR, both direct and derived, that reflect a customer's behavior are used. Examples of such variables that reflect behavior are the number of transactions, rate of increase of the number of transactions, average value per transaction, etc. Preferably, demographic variables are not used for generating behavioral segmentation. After the segments have been identified, the segments may be profiled with all of the variables including any demographic variables.

The customer data may then be segmented according to a second characteristic, step 302. The second characteristic may be, for example, value data. For the value segmentation, the variables that are used are preferably indicative of customer value. In one embodiment, the customer lifetime value may be used as the driving variable for this segmentation. Other value indicators like profitability, etc. may be used. A determination may then be made regarding whether the customer data is to be segmented according to a third characteristic, step 304. If the customer data is not to be segmented according to the third characteristic, a two-dimensional matrix for cross-segmenting the customers by both behavior data and value data may be generated, step 306. To do this, the value segments and the behavior segments may be "overlayed" and the behavior-value crossed segments may be profiled to get a joint view. If, however, a determination is made that the customer data is to be segmented according to a third characteristic, the customer data may segmented by a third characteristic, step 308.

After segmenting the customer data according to a third characteristic, a three-dimensional matrix for cross-segmenting a plurality of customers by the first, second, and third characteristics may be generated, step 310. The segmentation may be expanded to many data types generating a multi-dimensional hypercube that more completely characterizes the customers.

In the behavior-value segmentation embodiment of the invention, the segmentation may be performed by using a cluster analysis algorithm to identify latent clusters in the data. Most algorithms typically identify clusters that have a low ratio of within cluster variability to across cluster variability using some standard distance metrics. According to one embodiment of the invention, the algorithm used is driven by a business objective. This in turn permits the distance metrics that are used in the cluster analysis to be calibrated in the context of the stated business objective. In other words, the invention generates clusters that are more closely aligned with the business case and is therefore a semi-supervised segmentation as opposed to a completely unsupervised segmentation.

The approach to two dimensional modeling described above regarding behavior and value data may be applied to other characteristics that may influence customer behavior, such as, for example, attitude, satisfaction, brand experience, brand attachment, brand utility, and category involvement. Attitude may reflect a holistic view of a firm held by a customer. Satisfaction may be a day-to-day satisfaction resulting from current transactions between the customer and a firm. The brand experience may be the cumulative effect of day-to-day satisfaction. Brand attachment may be an attitude or feeling toward a brand by a customer. For example, brand attachment may be strongly influenced by advertising. Non-customers such as HARLEY DAVIDSON™ brand motorcycle aficionados may have a strong brand attachment. Attachment may be reinforced positively or negatively by brand experience. Brand utility may be a need for goods or services provided by a firm. The brand utility may be affected by lifestyle and life-stage factors. Category involvement may be a need for specific products and/or services. Category involvement may also be affected by lifestyle and life-stage factors.

Figure 7B:
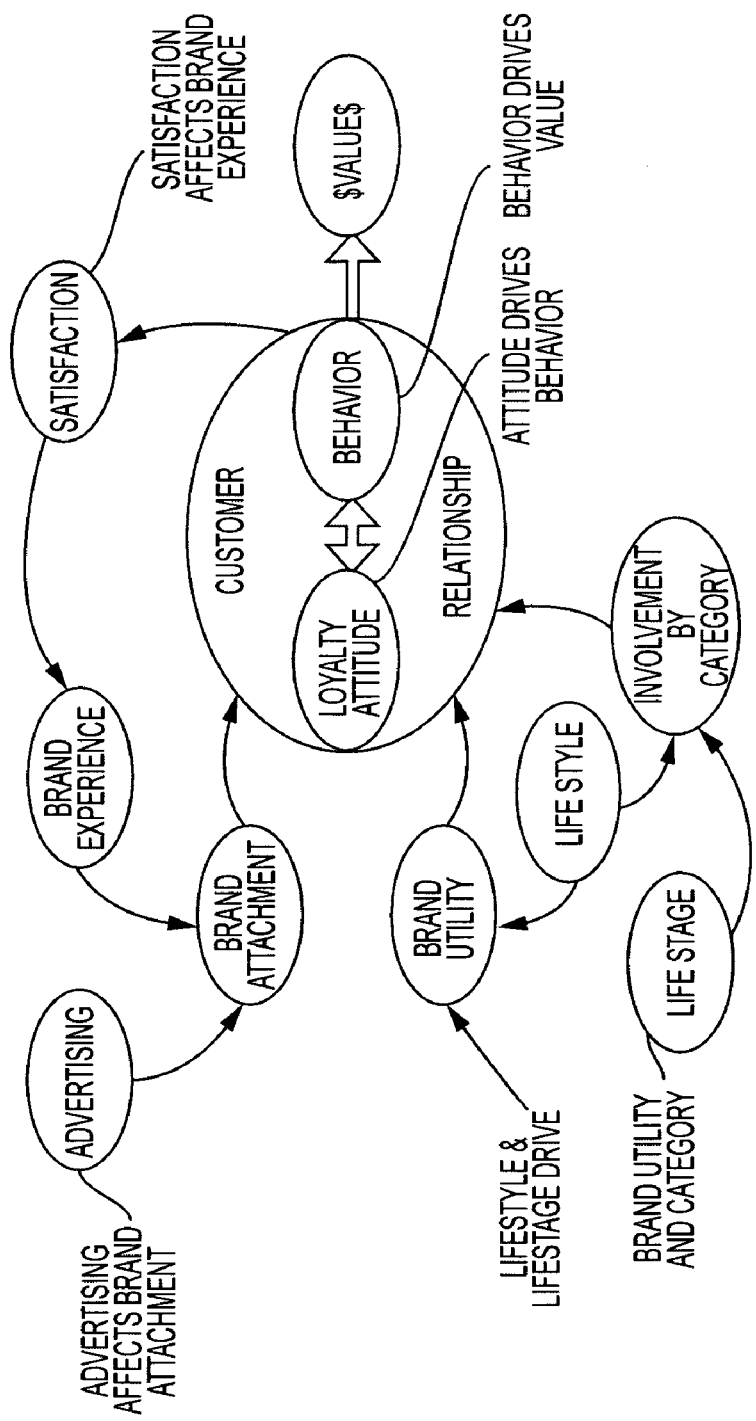
FIG. 7B is an illustration of relationships among characteristics that may drive customer behavior.

Applicants of this invention have found that there may be relationships between these characteristics that may ultimately affect customer behavior. FIG. 7B illustrates that: attitude drives behavior; behavior drives value; the relationship experience felt by the customer impacts customer satisfaction; satisfaction affects brand experience; brand experience affects brand attachment which is also impacted by advertising; life-stage and lifestyle affect brand utility and involvement by category; attitude is affected by brand experience, brand attachment, brand utility, and involvement by category; etc.

Figure 8:
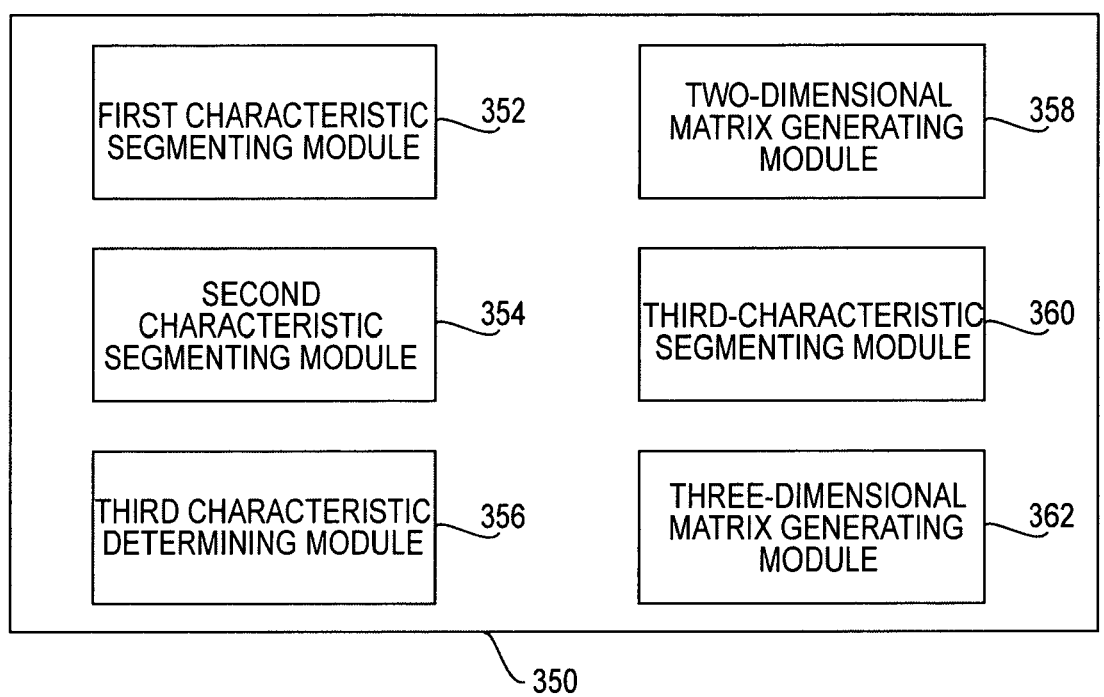
FIG. 8 is a system for developing multi-dimensional segmentation according to one embodiment of the invention.

FIG. 8 illustrates a system 350 for segmenting data representing a plurality of customers for use in a customer interaction according to one embodiment of the invention. The system 350 may include a first characteristic segmenting module 352. The first characteristic segmenting module 350 may segment the customer data according to a first characteristic. The first characteristic may be, for example, behavior, attitude, value, satisfaction, brand experience, brand attachment, brand utility, or category involvement. A second characteristic segmenting module 354 may be used to segment the customer data according to a second characteristic. The second characteristic may be, for example, any of the first characteristics not segmented. A third characteristic determining module 356 may be used to determine whether the customer data is to be segmented according to a third characteristic. If a determination is made that the customer data is not to be segmented according to a third characteristic, a two-dimensional matrix for cross-segmenting a plurality of customers by the first and second characteristics may be generated using two-dimensional matrix generating module 358. The segmentation may be expanded to many data types generating a multi-dimensional hypercube that more completely characterizes the customers.

If third characteristic determining module 356 determines that the customer data is to be segmented according to a third characteristic, a third characteristic segmenting module 360 may be used to segment the customer data according to the third characteristic. The third characteristic may be any of the characteristics not segmented by the first characteristic segmenting module 352 and the second characteristic segmenting module 354. After segmenting the customer data according to the third characteristic, a three-dimensional matrix generating module 362 may be used to generate a three-dimensional matrix for cross-segmenting the plurality of customers by the first, second, and third characteristics.

Figure 9:
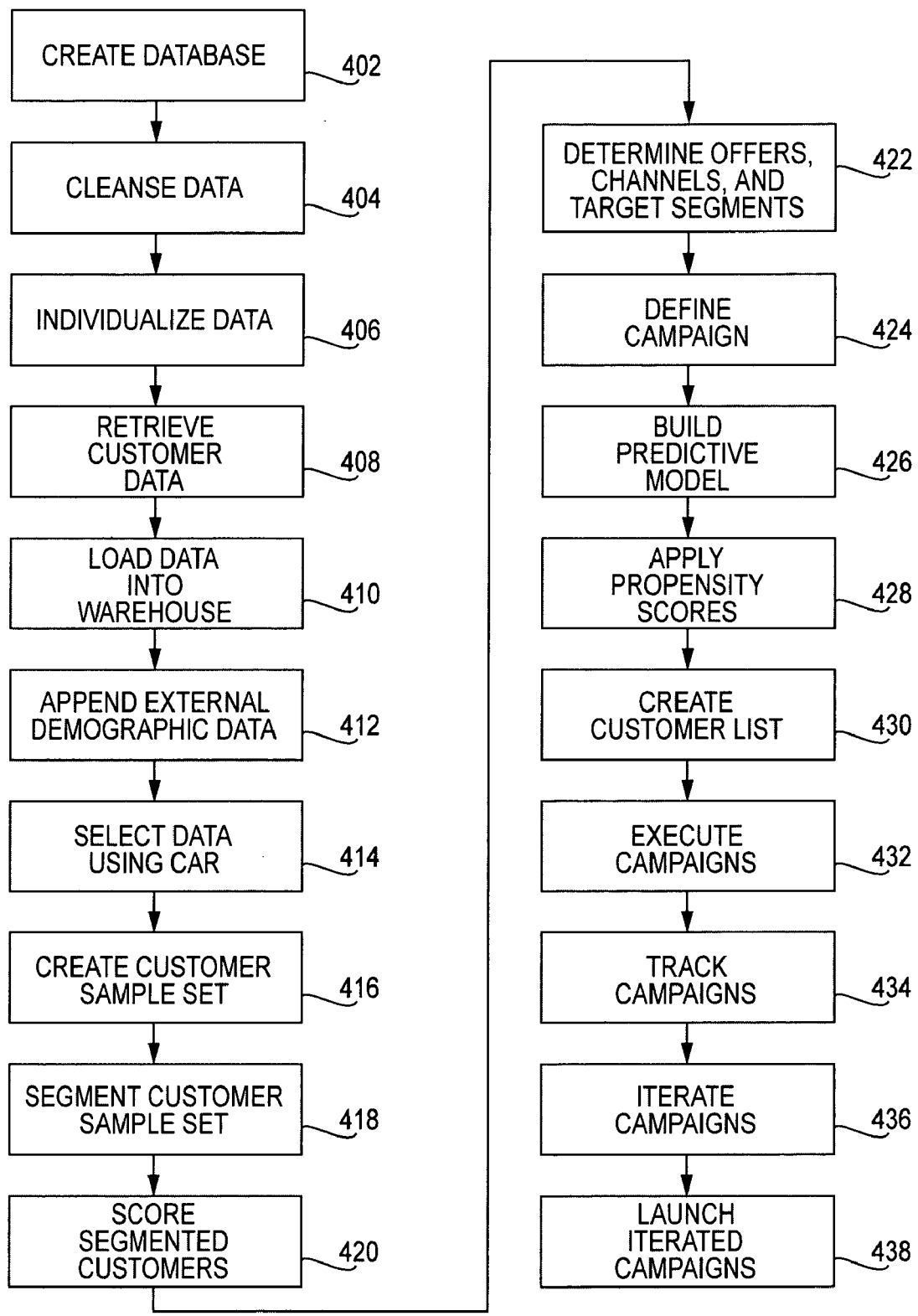
FIG. 9 is a method for adaptive marketing using insight driven customer interaction according to one embodiment of the invention.

FIG. 9 illustrates a method for adaptive marketing using insight driven customer interaction according to one embodiment of the invention. A database may be created, step 402. The database may be used to store customer data. The data may be cleansed (such as by removing duplicate records), step 404, and individualized, step 406. Individualizing the data may include providing an identifier to customer data that indicates the particular customer for whom that data was gathered. This enables the data to be cross-referenced easily according to a customer identifier. The customer data may be retrieved from plurality of databases, step 408. The customer data may then be loaded into, for example, a data warehouse, step 410. The customer data may be appended with demographic data for each customer gathered, step 412. The demographic data may be gathered from external sources. When a business wants to optimize the value of its customer relationships, it must learn to tailor customer interactions to the needs of its customers. To do this, a company needs to obtain an integrated view of the customer, segment its customers into groups, and assess how customers behave and will respond to various offers. Selecting data using the CAR may be the first step in the process, step 414. The data selected may be used to create a sample set of customer records for segmentation as well as drive predictive modeling.

A sample set of customer records may be created to reduce a number of customers for which customer segmenting may be performed, step 416. Preferably, the sample set is chosen at random, however, other methods may also be used. By using a random sample set, fewer customer records are used for segmentation while generating a substantially accurate depiction of customers. The customer records may be divided into segments, step 418. The customers within the segments may have one or more similar characteristics. The customers within the segments may be given a score, step 420. The score may be based on the segmentation results and quantitatively represent a customer. The marketing offer(s) to be delivered to the customers may be determined, a delivery channel determined, and the segments to be targeted identified, step 422. A campaign may be defined comprising of the offers proposed to targeted segments, step 424. The campaign may include marketing offers such as coupons or other incentives for purchasing a particular product or service.

A predictive model may be built to predict how customers may react to the marketing offers and which customers in a particular segment should receive the offers, step 426. The predictive model may provide propensity scores for the customers. The propensity scores may indicate which customers are more likely to accept a marketing offer. The propensity scores may then be applied to the customer data, step 428. A customer list may be created to identify which customers should be given the offer, step 430. The campaign may then be executed, step 432. This may include communicating the marketing offers to the customers via a customer interaction. The customer interaction may be a telephone call with a telemarketer, an electronic mail message, an offer received via regular mail, etc. Depending on how a customer reacts to the marketing offer, the marketing campaign may be adjusted accordingly. For example, if the customer provides a telemarketer with information that the telemarketer believes will induce the customer to accept a marketing offer, the telemarketer may customize the marketing offer for that customer.

The campaign results may be tracked, step 434. Tracking the campaign may include determining which customers have redeemed a marketing offer, which marketing offer was redeemed, and the time elapsed between communicating the marketing offer to the customer and when the offer was redeemed. Campaign tracking may also include updating the database with the campaign results. The campaign results may then be used to further refine existing campaigns or to define additional campaigns. After refining existing campaigns and defining one or more additional campaigns, the campaigns may be iterated, step 436. By iterating through campaigns, insight may be developed regarding how a customer may respond to marketing offers. This insight may then be used to generate more predictive models regarding a customer's behavior toward marketing offers in general or to specific types of marketing offers. Subsequent campaigns may then launched, step 438, using the insight developed such that the subsequent campaigns may produce a higher result of redeemed offers. The method for adaptive marketing using insight driven customer interaction may be repeated as desired to generate additional refined marketing campaigns.

Figure 10:
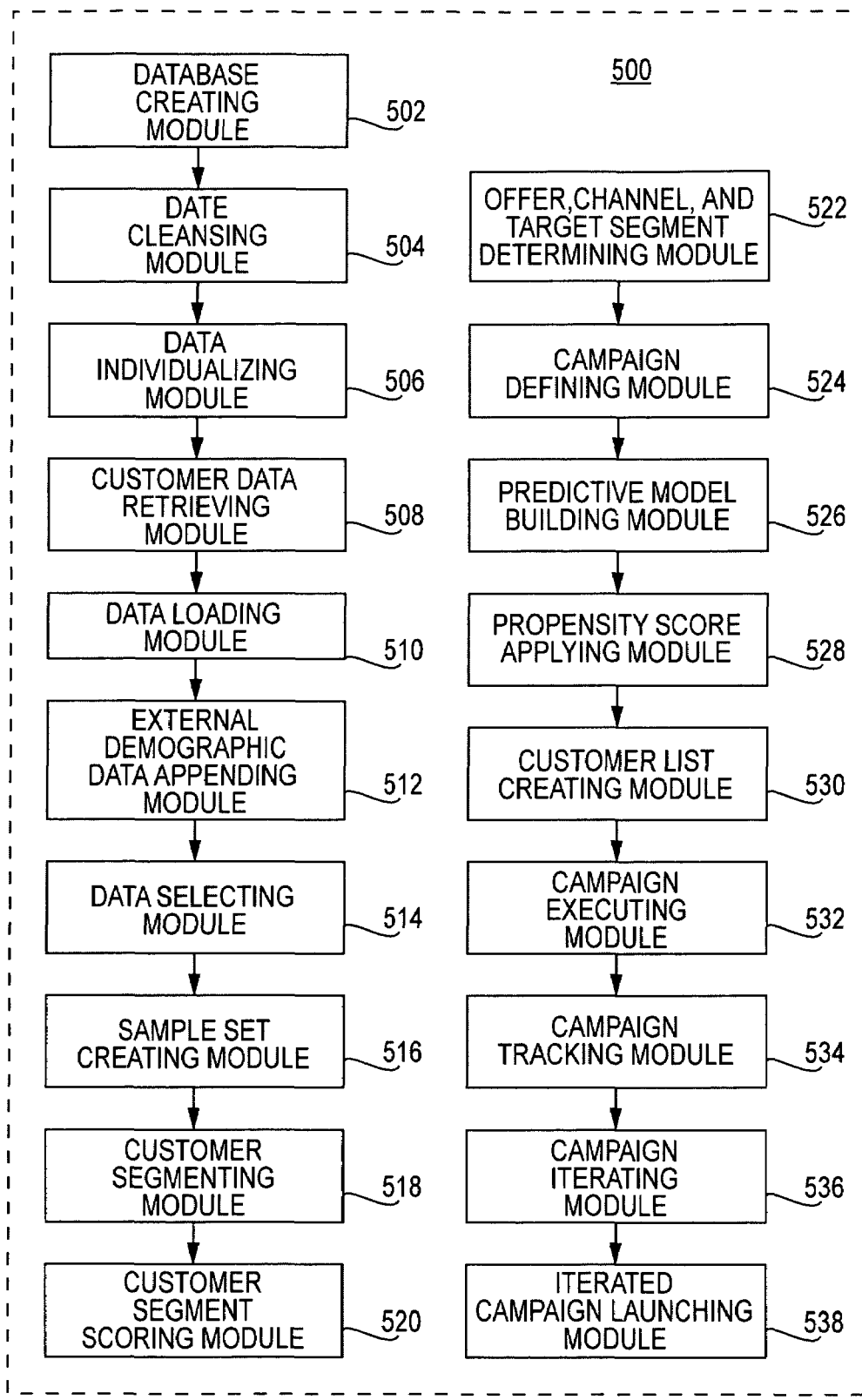
FIG. 10 is a system for adaptive marketing using insight driven customer interaction according to one embodiment of the invention.

FIG. 10 is a block diagram of a system 500 for adaptive marketing using insight driven customer interaction. The system 500 may include a database creating module 502. The database creating module 502 may be used to create a database for storing customer data that may be used for defining a marketing campaign. A data cleansing module 504 may be used to cleanse the data, such as by performing de-duplication. A data individualizing module 506 may be used to individualize the data for each customer that the data refers. The customer data may be retrieved from a plurality of databases using customer data retrieving module 508. A data loading module 510 may be used to load the cleansed and individualized data into, for example, a data warehouse. The data may then be appended with demographic data obtained related to each customer using external demographic data appending module 512. The demographic data may be, for example, obtained from an external data source.

A customer data selecting module 514 may be used to select customer data using the CAR. The CAR preferably includes all of the information needed about a customer that may be needed to group customers into segments and prepare predictive models. A sample set of customer records may be created to reduce a number of customers for which customer segmenting may be performed using sample set creating module 516. Preferably, the sample set is chosen at random, however, any method may be used. The customer records may be divided into segments using customer segmenting module 518. The customers within the segments may have one or more similar characteristics. The customers within the segments may be given a score using customer segment scoring module 520. The score may be based on the segmentation results and be used to quantitatively represent the customer. The marketing offer(s) that are to be delivered to customers may be determined along with a marketing channel and target segment(s) using offer, channel, and target segment determining module 522. The marketing channel may be, for example, electronic mail, regular mail, facsimile, telephone call, etc. Based on the offer(s), channel(s), and segment(s) determined, a marketing campaign may be defined using marketing campaign defining module 524.

A predictive model may be built using predictive model building module 526. The CAR prepared using CAR preparing module 514 may be used to select the customer data needed as input to the predictive model. The predictive model may be used to predict customer behavior regarding how a customer may respond to particular marketing offers. The predictive model may generate a propensity score for the customers. The propensity score may indicate how likely a customer is to accept a marketing offer. A higher score may indicate that customers within that segment are more likely to accept a particular marketing offer. The propensity score may then be applied to the customer data, step 528.

A customer list may be created to identify which customers should receive the offer using customer list creating module 530. The campaign may then be executed using campaign executing module 532. The campaign may be executed, for example, by mailing the offers via regular mail or electronic mail, telephoning the customers, or initiating some other kind of customer interaction.

The results of the campaign may be tracked using campaign tracking module 534. The results may include, for example, which marketing offers were accepted, which customers accepted the offers, and the time elapsed between offer and acceptance. This information may be used to iterate additional campaigns using campaign iterating module 536. The results may provide insight regarding customer behavior that may be used to refine additional marketing campaigns to increase the likelihood that a customer will accept the marketing offer. The iterated campaigns may be launched using iterated campaign launching module 538.

While the specification describes particular embodiments of the present invention, those of ordinary skill can devise variations of the present invention without departing from the inventive concept. For example, although the invention has been described in terms of a marketing campaign, the invention may be used with any type of customer interaction. For instance, customers who are the target of a marketing campaign may be given an offer if the customers call a particular business with a service request. Similarly, targeted customers may be given an offer when meeting in person with a sales representative of a business to conduct a sales transaction.

A marketing promotion may be offered as follows. Assume that a bank has executed the adaptive marketing steps described above to the point of defining a marketing campaign whereby on-line banking customers with a combined family income exceeding $100,000 per year will be offered a Platinum Mastercard™. The marketing offer may be defined in an offer database when the campaign is to be executed. The customers who are the target of the offer may be flagged. This information may be accessed and used when a targeted customer engages with the bank for any sort of transaction.

If the customer calls one of the bank's call centers to make a service request (e.g., validate the balance in an account, make an inquiry about a bank statement, etc), the call center agent may be given information that this customer is the target for the Platinum Mastercard™ promotion which could be offered after the service request is fulfilled. Similarly, if the customer is servicing an account using an on-line banking application, a web-based application may determine that the customer is the target of the marketing promotion and deliver the offer to the customer. If the customer visits a bank branch to open an account or buy a Certificate of Deposit, a sales agent may determine that the customer is the target of the promotion and offer the promotion to the customer.

Therefore, the adaptive marketing flow could affect all forms of customer interaction across multiple customer interaction channels. Note that the result of any interaction may be loaded into the customer data warehouse and later extracted to retrain the analytical models and either define new, improved marketing campaigns or to better target existing campaigns. All forms of interaction may benefit from and contribute to the iterative nature of the adaptive marketing process.

While the specification describes particular embodiments of the present invention, those of ordinary skill in the art can devise variations of the present invention without departing form the inventive concept.

We claim:

1. A computer-implemented method for building analytical models with standardized virtual flat files, comprising:
    creating at least one view of a database, wherein the at least one view comprises at least one database field and at least one transform, wherein the transform is based on database data; creating a virtual flat file from the at least one view, wherein the virtual flat file includes an identification data region, a product ownership data region, a behavior data region, a demographics data region, a model scores data region, and a contacts data region;
    building at least one analytical model using the virtual flat file as input variables for the analytical model;
    wherein the data regions of the virtual flat file comprise a complete input stream needed to perform a plurality of various customer analytical modeling wherein no additional data is required.

2. The computer-implemented method for building analytical models with standardized virtual flat files of claim 1, wherein a first subset of the complete input stream comprises a set of input variables for a first modeling program.

3. The computer-implemented method for building analytical models with standardized virtual flat files of claim 2, wherein a second subset of the complete input stream comprises a set of input variables for a second modeling program.

4. The computer-implemented method for building analytical models with standardized virtual flat files of claim 1, wherein the complete input stream comprises at least one variable that is derived from the database data.

5. The computer-implemented method for building analytical models with standardized virtual flat files of claim 1, wherein the virtual flat file contains data for assisting with adaptive marketing.

6. The computer-implemented method for building analytical models with standardized virtual flat files of claim 1, wherein the virtual flat file contains data for assisting with an insight-driven customer inter-action.

7. The computer-implemented method for building analytical models with standardized virtual flat files of claim 6, wherein the complete input stream comprises at least one variable that is derived from the database data.

8. The computer-implemented method for building analytical models with standardized virtual flat files of claim 6, wherein the virtual flat file contains data for assisting with adaptive marketing.

9. The computer-implemented method for building analytical models with standardized virtual flat files of claim 6, wherein the virtual flat file contains data for assisting with an insight-driven customer interaction.

* * * * *